US010194771B2

(12) United States Patent
Fu et al.

(10) Patent No.: US 10,194,771 B2
(45) Date of Patent: Feb. 5, 2019

(54) NON-STICK COOKING CONTAINER

(71) Applicant: SEB S.A., Ecully (FR)

(72) Inventors: Ji Qiang Fu, Hubei (CN); Yi Sheng Qu, Hubei (CN); Jun Chen, Hubei (CN)

(73) Assignee: SEB S.A., Ecully (FR)

( * ) Notice: Subject to any disclaimer, the term of this patent is extended or adjusted under 35 U.S.C. 154(b) by 463 days.

(21) Appl. No.: 14/888,516

(22) PCT Filed: Apr. 29, 2014

(86) PCT No.: PCT/FR2014/051024
§ 371 (c)(1),
(2) Date: Nov. 2, 2015

(87) PCT Pub. No.: WO2014/177804
PCT Pub. Date: Nov. 6, 2014

(65) Prior Publication Data
US 2016/0113439 A1    Apr. 28, 2016

(30) Foreign Application Priority Data

May 3, 2013 (CN) .......................... 2013 1 0160536

(51) Int. Cl.
*A47J 37/10*  (2006.01)
*A47J 36/02*  (2006.01)
*A47J 27/00*  (2006.01)

(52) U.S. Cl.
CPC .......... *A47J 36/025* (2013.01); *A47J 27/002* (2013.01)

(58) Field of Classification Search
CPC ........ A47J 36/02; A47J 36/025; A47J 27/002; A47J 27/00; Y10S 220/912

USPC .................... 220/573.1, 573.2, 912; 427/230
See application file for complete search history.

(56) References Cited

U.S. PATENT DOCUMENTS

| 5,628,426 A | 5/1997 | Doyle et al. |
| 2003/0126996 A1 | 7/2003 | Cheng |
| 2011/0041708 A1 | 2/2011 | Groll |

FOREIGN PATENT DOCUMENTS

| CN | 2369590 Y | 3/2000 | |
| CN | 1471888 A | 2/2004 | |
| CN | 201052068 A | 4/2008 | |
| CN | 102641078 * | 8/2012 | ............. A47J 27/00 |
| CN | 102641078 A | 8/2012 | |
| CN | 203341496 A | 12/2013 | |
| EP | 0259056 A1 | 8/1987 | |
| EP | 0510546 A1 | 10/1992 | |
| EP | 0560675 A1 | 9/1993 | |
| EP | 0594374 A1 | 10/1993 | |
| JP | 4739207 | 10/1972 | |

(Continued)

*Primary Examiner* — J. Gregory Pickett
*Assistant Examiner* — Elizabeth Volz
(74) *Attorney, Agent, or Firm* — The Webb Law Firm

(57) ABSTRACT

Provided is a non-stick cooking container, comprising a container body, in which the container body comprises a ribbed inner surface, the ribbed inner surface comprising a plurality of ribs and grooves arranged at regular intervals, a non-stick coating covering the surfaces of the ribs and the grooves, the ribs comprising a top surface, the grooves comprising a bottom surface. It is difficult to scratch or chip off the non-stick coating of the non-stick cooking container, which allows the cooking container to retain the non-stick properties over a long period.

25 Claims, 3 Drawing Sheets

(56) References Cited

FOREIGN PATENT DOCUMENTS

| JP | 488211 | | 3/1973 | |
|----|--------|---|--------|---|
| JP | 4329860 | A | 11/1992 | |
| WO | 0056537 | A1 | 9/2000 | |
| WO | WO0056537 | * | 9/2000 | ............. A47J 36/02 |

* cited by examiner

NON-STICK COOKING CONTAINER

CROSS-REFERENCE TO RELATED APPLICATIONS

This application is the United States national phase of International Application No. PCT/FR2014/051024 filed Apr. 29, 2014, and claims priority to Chinese Patent Application No. 201310160536.5 filed May 3, 2013, the disclosures of which are hereby incorporated in their entirety by reference.

TECHNICAL FIELD

The present invention concerns the field of kitchen utensils, and relates to non-stick cooking containers.

Non-stick cooking containers comprise in particular pans, woks, casseroles, and stewpots.

PRIOR ART

At the present time, existing non-stick cooking containers are generally cooking containers with flat bottoms treated by sand blasting or shot blasting, then by spraying on a non-stick coating. The non-stick coating of products treated by this method tends to scratch, chip off, and wear, thus shortening the useful life of these products.

Chinese Utility Patent No. CN2369590Y proposes a type of rigid and durable non-stick cooking container, which comprises a round center and concentric circles or scoring that extend to the rim of the cooking container; the cross-sectional area of the cooking container has sawtooth corrugations, the cross-sectional area of the cooking container being composed of crests, valleys, and sides. The surface of the cooking container is coated with a non-stick layer of Teflon®.

Although the aforementioned non-stick cooking container prolongs the useful life of the non-stick coating to a certain extent, the coating covering the crest of the saw teeth is easily scratched and chipped off during the use of the sawtooth corrugated structure as described above. The chipping off of this portion of the non-stick coating leads to chipping off on the crests of the surrounding corrugations and then to the appearance of large chipped-off areas, which consequently shortens the useful life of this coating.

Document EP0259056 discloses a non-stick cooking container having a ribbed inner surface covered with a non-stick coating. However, the ribs likewise have a sawtooth profile.

Document EP0510546 discloses a non-stick cooking container having a non-stick coating, which is deposited on a rough intermediate layer formed on a ribbed surface by plasma spraying. The ribbed surface has grooves that can be produced by knurling, specifically by knurling crisscross grooves. Producing such a vessels turns out to be relatively complicated.

SUMMARY OF THE INVENTION

The present invention proposes to provide a non-stick cooking container in which the useful life of the non-stick coating is effectively prolonged.

In order to achieve the aforesaid objective, the present invention provides a non-stick cooking container comprising a container body, the container body having a ribbed inner surface, the ribbed inner surface having numerous ribs and grooves arranged at regular intervals, a non-stick coating covering the surfaces of the ribs and grooves, the ribs having a top surface, the grooves having a bottom surface.

Advantageously then, the top surfaces of the ribs are flat or cambered and the bottom surfaces of the grooves are flat or cambered.

Advantageously still, the lateral walls of the ribs are flat or cambered.

Advantageously still, two neighboring ribs are separated by an interval measuring between 0.3 mm and 1 mm.

Advantageously still, the ratio of the width of the ribs to the interval is between ⅓ and ½.

Advantageously still, the separation angle between the two lateral walls of the same rib is an acute angle.

Advantageously then, the separation angle is between 25° and 45°.

Advantageously still, the vertical distance separating the highest point of the top surface of a rib and the lowest point of the bottom surface of a groove is between 0.12 mm and 0.45 mm.

Advantageously still, the roughness of the surface of the ribs is between 3 µm and 8 µm.

Advantageously still, the top surfaces of the ribs and the lateral walls of the ribs have concavities and are thus configured so as to form a rough, concave space.

Advantageously still, an anodic oxidation layer is disposed between the surface of the ribs and grooves on the one hand and the non-stick coating on the other.

In the state of the art of the present invention, the inner surface of the body of the cooking container has a ribbed area; this ribbed area has a plurality of ribs and grooves, and the surface of the ribs and grooves is covered with a non-stick coating. The function of the ribs is to strengthen the resistance to wear and to protect the cooking container; hence during the use of the cooking container, spatulas only contact the non-stick coating on the ribs and the non-stick coating in the bottom of the grooves is effectively protected and will not tend to be scratched or chipped off, thus enabling the non-stick properties of the cooking container to be retained for a long period. In the present invention, the ribs have a top surface. As for the prior art sawtooth corrugated structures, the non-stick coating adheres better to the top surfaces of the ribs and the non-stick coating does not tend to chip off during the use of the cooking container, and even if the non-stick coating of the top surfaces does chip off, the non-stick coating in the bottom of the grooves will not be affected thereby; furthermore, it is easier to ensure the thickness of the non-stick coating on top surfaces of the ribs, which improves the homogeneity of the non-stick surface. In addition, ribs provided with top surfaces are more resistant, they are less subject to wear or cracking, and they effectively strengthen and protect the cooking container. In the present invention, the grooves have a bottom surface. The bottom surface of the grooves does not have any acute angles, the non-stick coating freely circulates therein and fills the bottom smoothly and evenly as the coating is being sprayed on and no air pores form after sintering, which makes the non-stick coating even more consistent and therefore more solid and more resistant to corrosion.

BRIEF DESCRIPTION OF THE DRAWINGS

Some of the drawings appended to the description of the present invention serve to illustrate the present invention in a more detailed manner. The schematic application examples and their captions serve to explain the present invention and are in no way limiting to the present invention. In the appended drawings.

Following are the keys to the above-mentioned figures: 10=container body; 21=rib; 22=groove; 211=top surface of a rib; 212=lateral wall of a rib; 221=bottom surface of a groove; 22a=concavities; 30=non-stick coating.

DETAILED DESCRIPTION OF EMBODIMENTS OF THE INVENTION

It should be pointed out that unless stated otherwise, the exemplary embodiments of this patent application and the specifics of these exemplary embodiments can be combined with one another. In the rest of the text, reference was made to the appended drawings in association with exemplary embodiments for illustrating the present invention in more detail.

Figure 1:
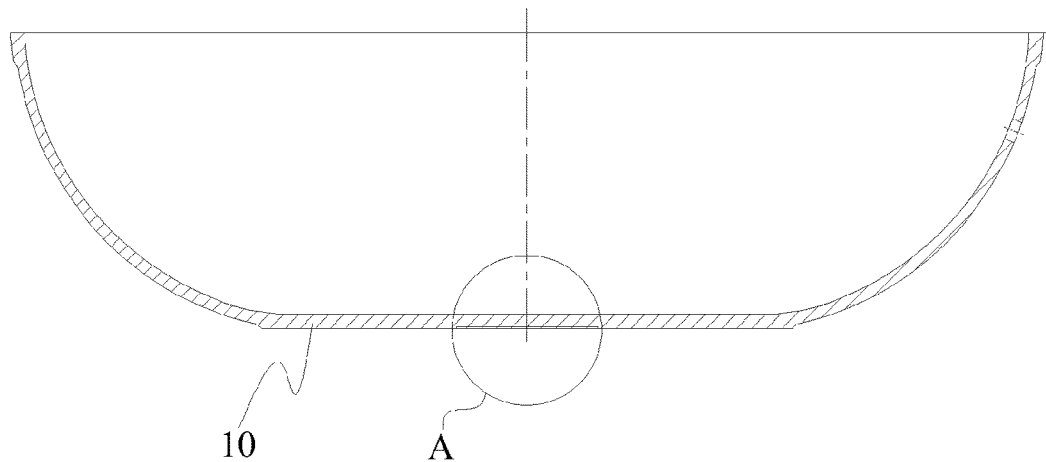
FIG. 1 is a cross-section of an exemplary embodiment of a non-stick cooking container of the present invention.
Figure 2:
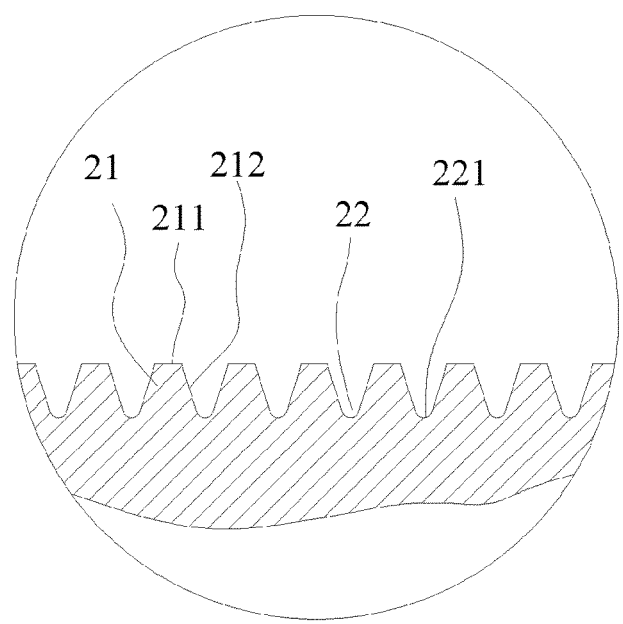
FIG. 2 is a magnification of the portion A of the non-stick cooking container illustrated in FIG. 1; the non-stick coating is not shown in FIG. 2.
Figure 3:
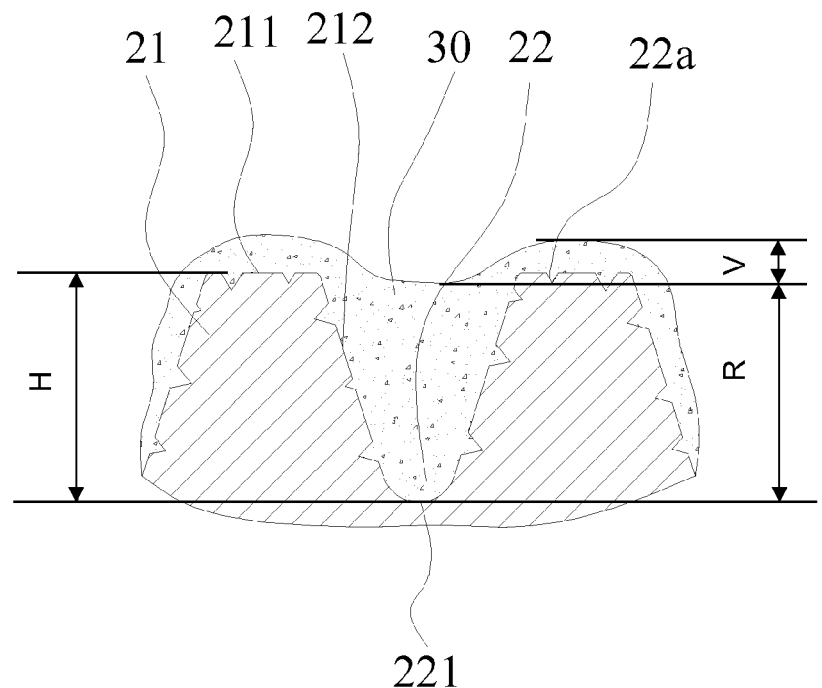
FIG. 3 is a partial diagram of the non-stick cooking container illustrated in FIG. 1; the non-stick coating is shown in FIG. 3.

As indicated in FIGS. 1 through 3, the non-stick cooking container of the first exemplary embodiment has a container body 10, the inner surface of the container body 10 has an area of convolutions, a plurality of ribs 21 and grooves 22 are arranged at regular intervals for forming the convolutions, and a layer of non-stick coating 30 covers the surfaces of the ribs 21 and grooves 22. The ribs 21 serve to strengthen the resistance to wear and to protect the cooking container; hence during the use of the cooking container, spatulas only contact the non-stick coating 30 on the ribs 21 and the non-stick coating 30 in the bottom of the grooves 22 is effectively protected and will not tend to be scratched or chip off, thus enabling the non-stick properties of the cooking container to be retained over a long period.

In the first exemplary embodiment, the ribs 21 have a top surface 211. As for the prior art sawtooth corrugated structures, the non-stick coating 30 adheres better to the top surfaces 211 of the ribs 21 and during the use of the cooking container the non-stick coating 30 does not tend to chip off, and even if the non-stick coating 30 of the top surfaces 211 does chip off, this will not affect the non-stick coating 30 in the bottom of the grooves 22; furthermore, it is easier to ensure the thickness of the non-stick coating 30 on the top surfaces 211 of the ribs 21, which improves the homogeneity of the non-stick coating 30. In addition, the ribs 21 provided with top surfaces 211 are more resistant, they are hardly subject to wear or breakage at all, and they effectively strengthen and protect the cooking container.

In the prior art, the bottom of the grooves 22 has an acute angle, and when the non-stick coating 30 is sprayed on, it has a hard time circulating freely therein and air pores tend to appear in the vicinity of the acute angle after sintering. In other words, the bottom of the grooves may be devoid of non-stick coating. In the first exemplary embodiment, the grooves 22 have a bottom surface 221, the bottom surface of the grooves 22 does not have any acute angles, the non-stick coating circulates freely therein and fills the bottom smoothly and evenly as the non-stick coating is sprayed on, and no air pores form after sintering, thus rendering the non-stick coating 30 even more consistent and therefore more solid and more resistant to corrosion.

The above-mentioned convolution area can be obtained by treating the inner surface of the container body 10. A ribbed inner surface is thus obtained. Obviously persons skilled in this technical field know that the present invention is not limited to this convolution area, and that a simple ribbed area suffices. The aforementioned ribbed area can also be a concentric area or even an area of uniform and parallel straight/curved lines; the principle and the function of this concentric area or area of uniform and parallel straight/curved lines are similar to those of the convolution area; this subject shall not be discussed in any further detail here.

In addition, the above-mentioned ribbed area can cover the entire inner surface of the container body or just the bottom of the cooking container, or even the bottom of the cooking container and a portion of the walls of the cooking container.

As indicated in FIG. 3, in the first exemplary embodiment the top surfaces 211 have a flat surface and the lateral walls 212 of the ribs 21 are flat; in other words the cross-section of the ribs 21 is trapezoid-shaped and the bottom surface 221 of the grooves is cambered. The aforementioned structure allows the non-stick coating 30 to circulate freely and cover the surface smoothly and evenly without leaving air pores, which improves the consistency and the adhesion of the non-stick coating. The space between the top surfaces 211 and the lateral walls 212 of the ribs 21 will preferably have the shape of a bevel angle.

Figure 5:
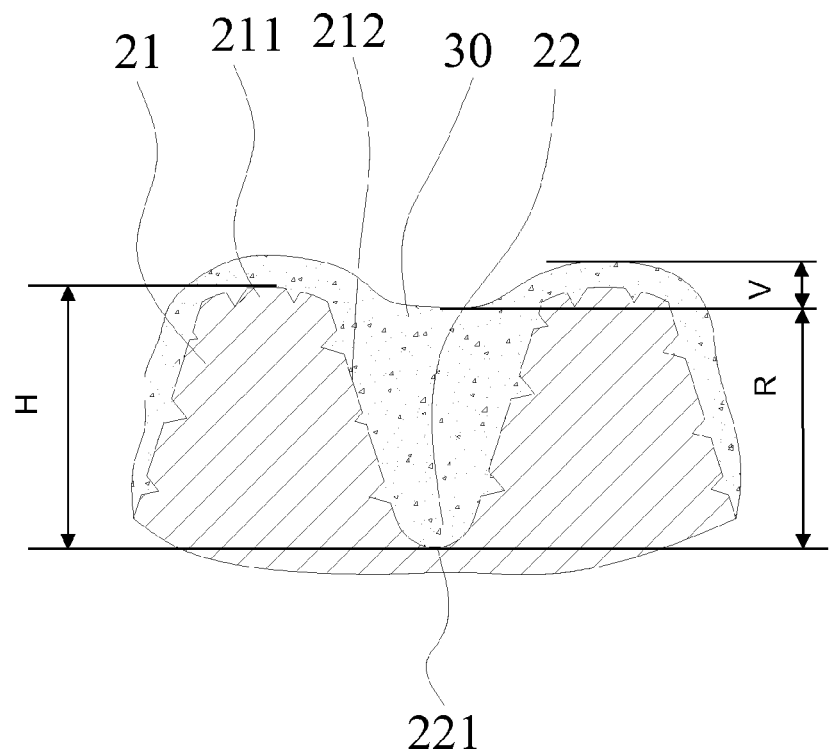
FIG. 5 is a partial diagram of a second exemplary embodiment of a non-stick cooking container of the present invention; the non-stick coating is shown in FIG. 5.

As indicated in FIG. 5, the difference between the second exemplary embodiment and the first exemplary embodiment lies only in the fact that in the second exemplary embodiment, the top surfaces 211 of the ribs 21 are cambered. As is readily discernible in FIG. 5, the top surfaces 211 of the ribs 21 are outwardly arched. Persons skilled in this technical field know that the top surfaces 211 of the ribs 21 can also have a structure other than a cambered one, the bottom surfaces 221 of the grooves 22 can also be flat, and the lateral walls 212 of the ribs 21 can also be cambered for the embodiment to be achievable.

Figure 4:
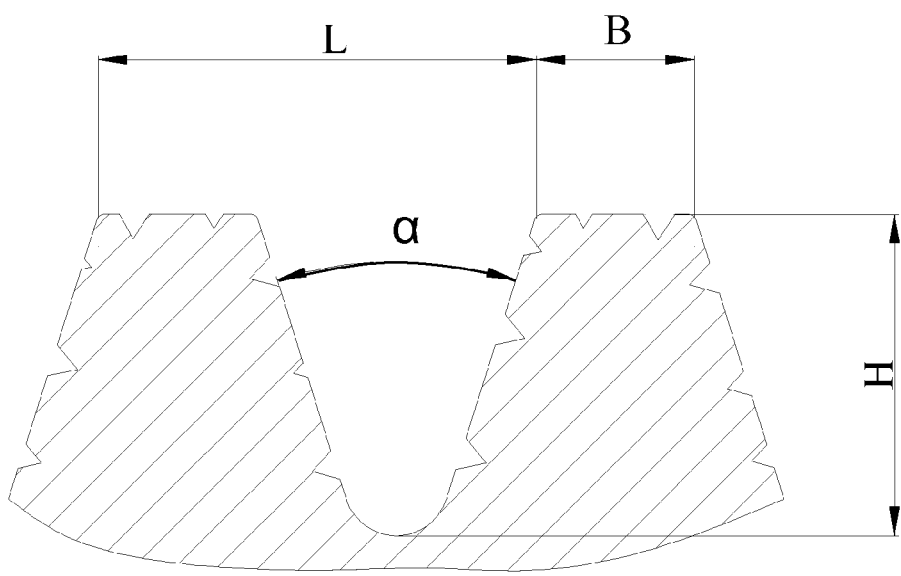
FIG. 4 is a partial diagram of the non-stick cooking container illustrated in FIG. 1, the non-stick coating is not shown in FIG. 4.

As indicated in FIGS. 2 and 4, the intervals L between two neighboring ribs 21 of the ribbed area will be preferably equal, in other words the ribs will be distributed in a uniform manner on the bottom of the container body 10, from the center to the outside. The aforementioned intervals L between the ribs 21 must be in relation to the contact surface between the spatula and the inner surface of the container body 10 during the cooking of food such that the spatula can neither scratch the bottom of the grooves 22 filled with non-stick coating 30 nor chip the non-stick coating 30 off of the surface of the ribs 21 entirely. As indicated in FIG. 4, in the first exemplary embodiment the inventors determined after countless studies and experiments that the optimum interval L between two neighboring ribs 21 is between 0.3 mm and 1 mm. When the interval L is smaller than 0.3 mm, the non-stick coating floats on the surface and does not effectively fill the grooves 22, and is also easily scratched by spatulas. When the interval L is larger than 1 mm, spatulas can enter the grooves 22 and scratch the non-stick coating 30.

As indicated in FIGS. 3 and 4, the inventors determined after countless studies and experiments that the ideal ratio of the width B of the ribs 21 to the interval L is in the range of ⅓ to ½. When the ratio of the width B of the ribs 21 to the interval L is less than ⅓, the ribs 21 are not sufficiently solid and tend to get scratched or to break. When the ratio of the width B of the ribs 21 to the interval L is greater than ½, after the non-stick coating 30 of the ribs 21 has been worn through the use of the cooking container, the exposed surface of the cooking container is relatively large and the non-stick properties of the cooking container diminish rapidly. As is readily discernible in FIGS. 3 and 4, the interval L includes the width B at the top surface of a rib 21 as well as the space between the top surfaces 211 of two adjacent ribs 21.

When the interval L between the ribs 21 lies in the range of 0.3 mm to 1 mm, and when the ratio of the width B of the ribs 21 to the interval L lies in the range of ⅓ to ½ after the application of the adhesive coating 30, the ribs of the inner surface of the container body 10 are still visible with the naked eye.

As indicated in FIGS. 2 and 4, the separation angle α between the two lateral walls 212 of the same rib 21 is an acute angle. The inventors determined after countless studies and experiments that the separation angle α must be between 25° and 45° in order to obtain the best results.

As indicated in FIGS. 3 and 4, the inventors determined after countless studies and experiments that the optimum vertical distance H separating the highest point of the top surface 211 of a rib 21 and the lowest point of the bottom surface 221 of a groove 22 is between 0.12 mm and 0.45 mm. When the vertical distance H is less than 0.12 mm, it is impossible to form an effective support point. When the vertical distance H is greater than 0.45 mm, the non-stick coating does not circulate well and tends not to penetrate to the interior of the grooves 22 and the grime that builds up in the grooves during the use of the cooking container is difficult to clean out.

Preference is given to a roughness Ra of the surface of the ribs 21 of between 3 μm and 8 μm. This surface roughness can be obtained by sand blasting or by another roughening method (e.g., shot blasting, chemical corrosion or electrochemical corrosion, etc.). The aforementioned surface roughness makes it possible to ensure excellent adhesion and solidness of the non-stick coating 30.

As indicated in FIG. 3, preference is given to top surfaces 211 of the ribs 21 and lateral walls 212 of the ribs 21 having concavities 22a configured so as to form a rough, concave space. These concavities 22a make it possible to increase the adhesion surface and ensure excellent adhesion and solidity of the non-stick coating 30.

As can be readily discerned in FIGS. 3 and 5, the thickness of the non-stick coating 30 on the bottom surface 221 of a groove 22 is greater than the thickness of the non-stick coating 30 on the top surface 211 of an adjacent rib 21.

As can be readily discerned in FIGS. 3 and 5, the vertical distance H separating the highest point of the top surface 211 of a rib 21 and the lowest point of the bottom surface 221 of an adjacent groove 22 is greater than the height difference V of the non-stick coating 30 between the top surface 211 of said rib 21 and the bottom surface 221 of said groove 22.

As can be readily discerned in FIGS. 3 and 5, the thickness R of the non-stick coating 30 on the bottom surface 221 of a groove 22 is greater than the height difference V of the surface of the non-stick coating 30 between the bottom surface 221 of said groove 22 and the top surface 211 of an adjacent rib 21.

As can be readily discerned in FIGS. 3 and 5, the vertical distance H separating the highest point of the top surface 211 of a rib 21 and the lowest point of the bottom surface 221 of an adjacent groove 22 is greater than the thickness R of the non-stick coating 30 on the bottom surface 221 of said groove 22.

As can be readily discerned in FIGS. 3 and 5, the lateral wall 212 of a rib 21 and the bottom surface 221 of an adjacent groove 22 are connected by a rounded wall.

Preference is given to an anodic oxidation layer disposed between the surface of the ribs 21 and the grooves 22 in question and the non-stick coating 30. An anodic oxidation layer is thus disposed between the surface of the ribs 21 and the grooves 22 on the one hand, and the non-stick coating 30 on the other. This anodic oxidation layer is produced, before the step of spraying the non-stick coating 30, by the hard anodization method, which method confers a certain rigidity and good resistance to wear and breakage to the ribs 21. The thickness of the anodic oxidation layer is preferably between 20 μm and 45 μm, for a hardness preferably ranging from 150 Hv to 600 Hv. In order to ensure the non-stick effects, the thickness of the non-stick coating 30 is preferably between 15 μm and 50 μm.

Specific application examples have been compiled in the following to explain the beneficial results of the present invention in more detail.

The non-stick cooking container of application examples 1 through 9 and of comparative examples 1 through 8 is obtained by the following manufacturing methods:

(1.) Die-casting of the container body: the container body is produced by pressure die-casting an aluminum alloy such as to form a cambered or flat bottom; after cleaning it undergoes a sintering step. The container body 10 is thus made of die-cast aluminum alloy.

(2.) Convolution area: the convolutions are produced according to the parameters listed in Table 1; the convolution area is disposed over the entire inner surface of the container body; the cross-section of the ribs of the convolutions has a trapezoidal shape and the bottom of the grooves is cambered.

(3.) Sand blasting: a no. 46 emery sand is used for the sand blasting, making it possible to obtain a roughness Ra of 5 μm for the surface of the ribs.

(4.) Hard anodization: after the above-mentioned treatment steps, the container body undergoes a hard anodization treatment, which produces a 30 μm thick anodic layer with a hardness of 350 Hv.

(5.) Spraying of the non-stick coating: a fluorinated resin-based non-stick coating, which forms a 35 μm thick layer, is sprayed on the inner surface of the container body; the surface undergoes a 6 minute sintering phase at 380° C. when the spraying is finished.

The non-stick cooking container obtained in application examples 1 through 9 and comparative examples 1 through 8 is subjected to measures carried out according to the acceleration simulation test method; see Table 1 for the performances.

The test method consists of simulating the mechanism of deterioration of the non-stick coating during everyday use of the cooking container by consumers for cooking food, wherein the cooking habits of Chinese consumers are reflected and wherein reinforced mechanical simulation tests are included in order to evaluate the useful life of the non-stick coating of the cooking container, using the number of acceleration simulation test cycles as an evaluation criterion. The method of evaluating the useful life and the properties of the non-stick coating of the cooking container and the acceleration simulation test method are as follows:

I. Method of Evaluating the Useful Life of the Non-stick Coating:

For performing a level assessment, an egg is cooked at the end of each acceleration simulation test cycle. If while cooking the egg the diameter of the chipped surface of the non-stick coating is greater than 6 mm or if the non-stick layer has more than 10 deep scratches running through it, the test is stopped and the number of simulation test cycles is recorded. The greater the number of cycles, the longer the useful life of the non-stick coating.

II. Method of Evaluating the Properties of the Non-stick Coating:

The method of evaluating the properties of the non-stick coating has the following steps:

At the end of each simulation test cycle, the sample is cleaned and the water remaining on the surface is wiped off.

The inner surface of the container body is dried and then a layer of cooking oil is applied evenly to it, using a sponge or other soft object and avoiding the formation of drops or puddles of oil.

The cooking container thus oiled is heated on a gas range to a temperature of between 140 and 170° C.

An egg is cracked and poured onto the hot cooking container and allowed to coagulate; the egg is then removed from the cooking container, the non-stick properties of the cooking container are evaluated on the basis of this action, and then recorded.

III. Acceleration Simulation Test Method:

A wooden spatula is used for the acceleration simulation tests. The test procedures are as follows:

Step A: wear test by shell vibration

Step B: cooking of a mixture composed of various seasonings

Step C: wear test using steel wires

Step D: frying potatoes

Step E: evaluation of the non-stick properties by cooking an egg

The end of the 4 test steps+1 step of evaluating the non-stick properties as described above corresponds to the completion of one cycle.

Details of step A: wear test by shell vibration:

Measuring instrument: vibration wear test apparatus.

Concrete description of this test:

(1.) 500 g of shells are placed in the non-stick cooking container, and the opening is then sealed with aluminum adhesive tape.

(2.) The non-stick cooking container is placed in an infrared or other type of oven.

(3.) The test apparatus is set to vibrate for 15 minutes, at a temperature of between 150 and 180° C. and with a speed of 400 rpm.

(4.) The start button is pressed in order to vibrate the shells in the non-stick container for 15 minutes.

(5.) When the test is finished, the shells are removed from the non-stick cooking container and the latter is properly cleaned using tap water.

Details of step B: cooking of a mixture composed of various seasonings:

Ingredients: soybean oil, vinegar, salt, sugar, Guilin hot sauce, ketchup.

Concrete description of this test:

(1.) The mixture in question is prepared in the following proportions:

70% tap water, 5% soybean oil, 5% vinegar, 5% salt, 5% sugar, 5% Guilin chili sauce, 5% ketchup, which are mixed until a homogeneous mixture is obtained.

(2.) 1800 ml of this mixture are poured into the non-stick cooking container; the cooking container is placed on a gas range; more liquid may be added as needed if the bottom of the cooking container is not covered completely.

(3.) The mixture is heated until boiling and allowed to boil for 30 minutes. During this time water can be added at regular intervals to the mixture in order to maintain the thickness and the consistency of the liquid.

(4.) When the cooking time has elapsed, the mixture is removed and the cooking container is cleaned with tap water.

Details of step C: wear test using steel wires:

Test instrument: Abrasion and wear test machine equipped with a device with steel wires Concrete description of this test:

(1.) A suitable quantity of cooking oil is poured into the non-stick cooking container.

(2.) The cooking container is heated on a gas range, the number of abrasions of the measuring instrument is set to 400, and the temperature of the oil is brought to between 180 and 220° C.

(3.) When the test is finished, the cooking oil is removed from the non-stick cooking container.

(4.) It is necessary to make sure that the steel wires are correctly and firmly positioned during the test. For each test cycle, the wear level of the surface of the steel wires must be checked and the latter must be repaired or replaced if they show obvious signs of wear.

Details of step D: frying of potatoes:

Ingredients: 300 g of potatoes and 500 of frying oil.

Concrete description of this test:

(1.) The potatoes are cut into French fries.

(2.) 500 g of frying oil are poured into the non-stick cooking container.

(3.) The cooking container is heated on a gas range, and once the oil is hot enough the fries are put in it, and fried until they are golden-brown on the outside.

(4.) The fries and then the oil are removed from the non-stick cooking container.

TABLE 1

|  | L (mm) | B/L (width/ interval) | α (°) | H (mm) | Useful life of the non-stick coating (no. cycles) |
| --- | --- | --- | --- | --- | --- |
| Application example 1 | 0.3 | 5/12 | 35° | 0.3 | 8 |
| Application example 2 | 0.6 | 5/12 | 35° | 0.3 | 10 |
| Application example 3 | 1 | 5/12 | 35° | 0.3 | 5 |
| Application example 4 | 0.6 | 1/3 | 35° | 0.3 | 7 |
| Application example 5 | 0.6 | 1/2 | 35° | 0.3 | 7 |
| Application example 6 | 0.6 | 5/12 | 25° | 0.3 | 6 |
| Application example 7 | 0.6 | 5/12 | 45° | 0.3 | 6 |
| Application example 8 | 0.6 | 5/12 | 35° | 0.12 | 6 |
| Application example 9 | 0.6 | 5/12 | 35° | 0.45 | 5 |
| Comparative example 1 | 0.1 | 5/12 | 35° | 0.3 | 2 |
| Comparative example 2 | 1.2 | 5/12 | 35° | 0.3 | 1 |
| Comparative example 3 | 0.6 | 1/5 | 35° | 0.3 | 2 |
| Comparative example 4 | 0.6 | 3/4 | 35° | 0.3 | 2 |

TABLE 1-continued

| | L (mm) | B/L (width/ interval) | α (°) | H (mm) | Useful life of the non-stick coating (no. cycles) |
|---|---|---|---|---|---|
| Comparative example 5 | 0.6 | 5/12 | 15° | 0.3 | 2 |
| Comparative example 6 | 0.6 | 5/12 | 60° | 0.3 | 2 |
| Comparative example 7 | 0.6 | 5/12 | 35° | 0.04 | 1 |
| Comparative example 8 | 0.6 | 5/12 | 35° | 0.6 | 2 |

According to the data comparison of Table 1, in which the results were compared with reasonable values for the four types of parameters, it is evident that the resistance to wear properties of the non-stick coating of the cooking container obtained by application examples 1-9 of the present invention are far superior to those of the non-stick cooking container obtained by comparative examples 1-8. Application example 2 exhibits the best properties. According to Table 1 it is also evident that the non-stick cooking container obtained by the techniques of the present invention possesses a longer useful life.

The above-mentioned application examples merely represent the best examples of application of the present invention; they are in no way limiting to the other applications of the present invention. Diverse modifications and changes to the present invention may be made by technicians in the relevant fields. Any modifications, replacements, or improvements made in keeping with the intent and principles of the present invention are included in the scope of protection of the present invention.

The invention claimed is:

1. A non-stick cooking container comprising a container body, wherein the container body has a ribbed inner surface, the ribbed inner surface having a plurality of ribs and grooves disposed at regular intervals, a non-stick coating covering the surfaces of the ribs and grooves, the ribs having a top surface, the grooves having a bottom surface, a width (B) at the top surface of the ribs being greater than a thickness of the non-stick coating on the top surface of the ribs, wherein the thickness (R) of the non-stick coating on the bottom surface of a groove is greater than a height difference (V) of the surface of the non-stick coating between the bottom surface of said groove and the top surface of an adjacent rib.

2. The non-stick cooking container as in claim 1, wherein the top surfaces of the ribs are flat or cambered and wherein the bottom surfaces of the grooves are flat or cambered.

3. The non-stick cooking container as in claim 1, wherein lateral walls of the ribs are flat or cambered.

4. The non-stick cooking container as in claim 1, wherein two neighboring ribs are separated by an interval (L) measuring between 0.3 mm and 1 mm.

5. The non-stick cooking container as in claim 4, wherein a ratio of a width (B) of the ribs to the interval (L) is between ⅓ and ½.

6. The non-stick cooking container as in claim 1, wherein a separation angle (α) between two lateral walls of the same rib is an acute angle.

7. The non-stick cooking container as in claim 6, wherein the separation angle (α) is between 25° and 45°.

8. The non-stick cooking container as in claim 1, wherein a cross-section of the ribs has a trapezoidal shape.

9. The non-stick cooking container as in claim 1, wherein a lateral wall of a rib and the bottom surface of an adjacent groove are connected by a rounded wall.

10. The non-stick cooking container as in claim 1, wherein a vertical distance (H) separating a highest point of the top surface of a rib and a lowest point of the bottom surface of a groove is between 0.12 mm and 0.45 mm.

11. The non-stick cooking container as in claim 1, wherein the thickness of the non-stick coating on the bottom surface of a groove is greater than the thickness of the non-stick coating on the top surface of an adjacent rib.

12. The non-stick cooking container as in claim 1, wherein a vertical distance (H) separating a highest point of the top surface of a rib and a lowest point of the bottom surface of an adjacent groove is greater than the height difference (V) of the surface of the non-stick coating between the top surface of said rib and the bottom surface of said groove.

13. The non-stick cooking container as in claim 1, wherein a vertical distance (H) separating a highest point of the top surface of a rib and a lowest point of the bottom surface of an adjacent groove is greater than the thickness (R) of the non-stick coating on the bottom surface of said groove.

14. The non-stick cooking container as in claim 1, wherein the thickness of the non-stick coating is between 15 μm and 50 μm.

15. The non-stick cooking container as in claim 1, wherein a roughness (Ra) of the surface of the ribs is between 3 μm and 8 μm.

16. The non-stick cooking container as in claim 1, wherein the top surfaces of the ribs and lateral walls of the ribs have concavities configured so as to form a rough, concave space.

17. The non-stick cooking container as in claim 1, wherein an anodic oxidation layer is disposed between the surface of the ribs and grooves, and the non-stick coating.

18. The non-stick cooking container as in claim 17, wherein a thickness of the anodic oxidation layer is between 20 μm and 45 μm.

19. The non-stick cooking container as in claim 17, wherein a hardness of the anodic oxidation layer is between 150 Hv and 600 Hv.

20. The non-stick cooking container as in claim 1, wherein the container body is made of a die-cast aluminum alloy.

21. The non-stick cooking container as in claim 1, wherein the bottom surface of the grooves does not have any acute angles.

22. The non-stick cooking container as in claim 1, wherein the bottom surface of the grooves is cambered.

23. The non-stick cooking container as in claim 1, wherein the bottom surface of the grooves is concave.

24. The non-stick cooking container as in claim 1, wherein the ribs have two lateral walls connecting the top surface to the bottom surfaces of the adjacent grooves.

25. The non-stick cooking container as in claim 1, wherein a width at the bottom surface of the grooves is greater than the thickness of the non-stick coating on the bottom surface of the grooves.

* * * * *